Feb. 1, 1966
H. D. DEARDORF
3,232,569
CONDUIT CLAMP
Filed July 24, 1963
2 Sheets-Sheet 1
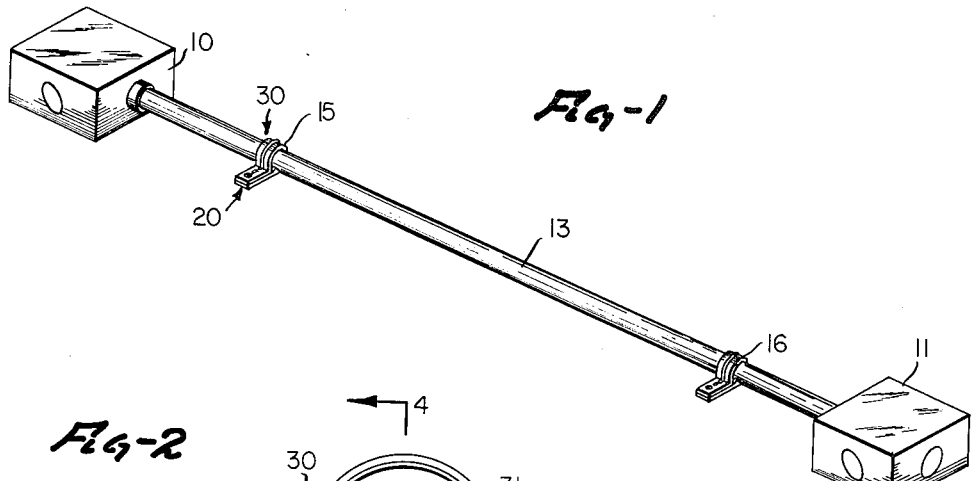
FIG-1
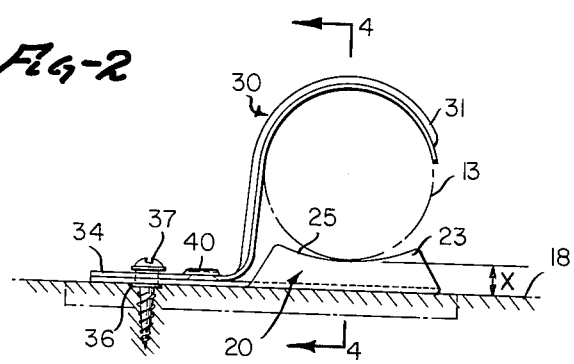
FIG-2
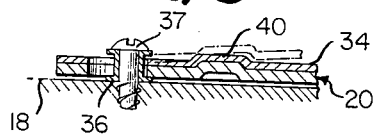
FIG-5
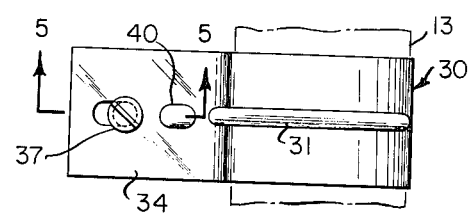
FIG-3
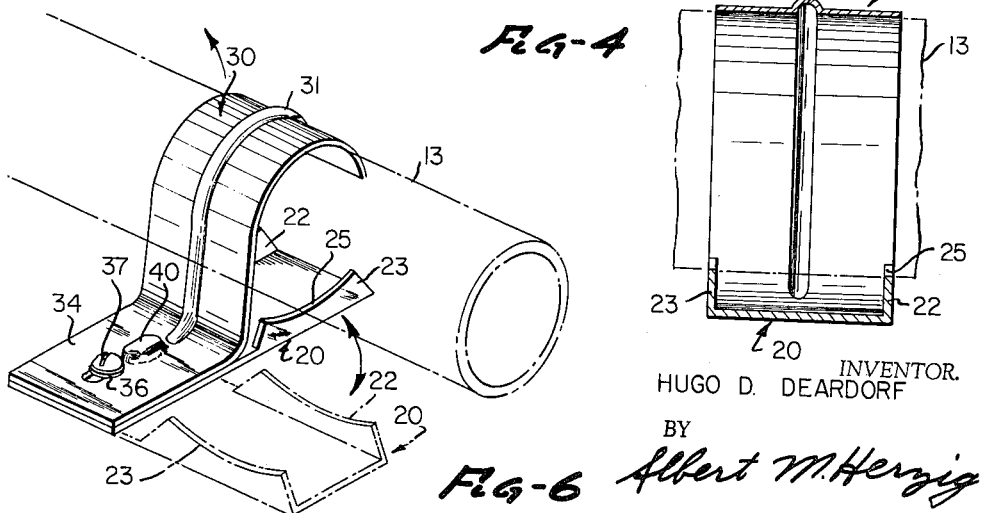
FIG-4
FIG-6
INVENTOR.
HUGO D. DEARDORF
BY Albert M. Herzig
ATTORNEY Feb. 1, 1966  H. D. DEARDORF  3,232,569
CONDUIT CLAMP
Filed July 24, 1963  2 Sheets-Sheet 2
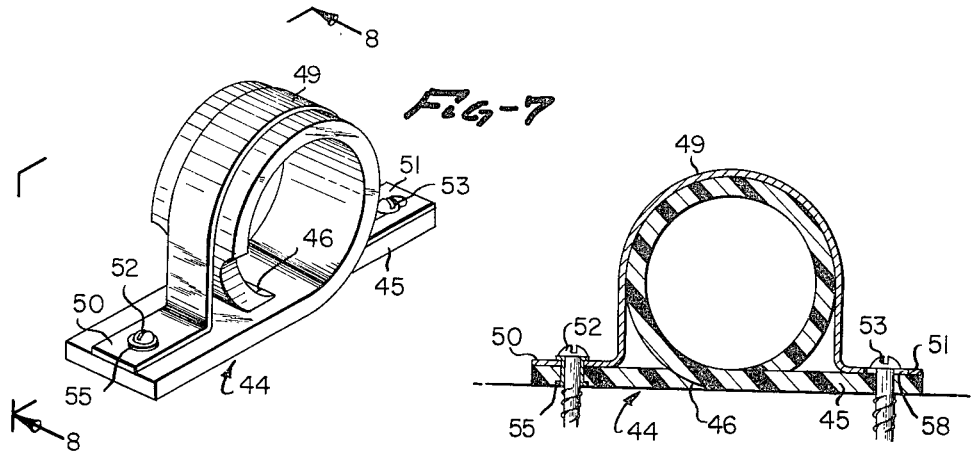
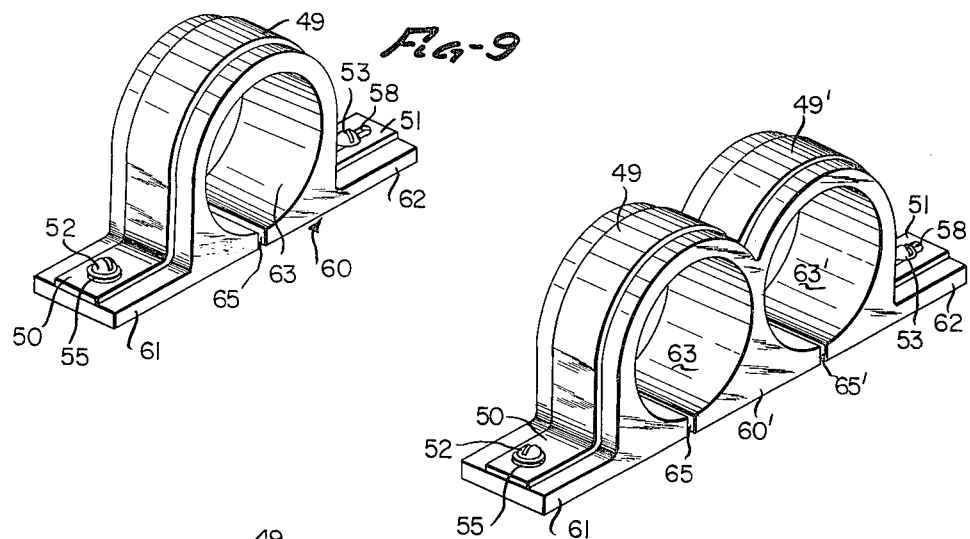
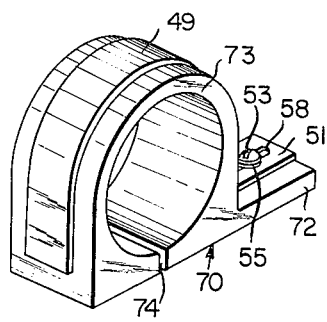
INVENTOR.
HUGO D. DEARDORF
BY
Albert M. Herzig
ATTORNEY

United States Patent Office 3,232,569
Patented Feb. 1, 1966

3,232,569
CONDUIT CLAMP
Hugo D. Deardorf, 1037 Mar Vista, Whittier, Calif.
Filed July 24, 1963, Ser. No. 297,420
3 Claims. (Cl. 248—74)

This invention relates to conduit clamps and more particularly to an improved conduit clamp or clamps for attaching or clamping electrical conduits or cables or the like to a surface.

The invention has particular application in the clamping or securement to surfaces such as a wall or a floor, of electrical conduits running between two junction or conduit boxes. The conduit boxes ordinarily are designed so that the conduit opening may be 1/4", 1/2", 3/4" or 1" from the surface to which the boxes are attached. In some cases, rigid conduits may be used between boxes, but more generally, electric metallic tubing is used which is a steel tubing known as EMT. Ordinarily in joining two such boxes by conduit an electrical contractor would secure the conduit directly to the adjacent surface by clamps which might be clamps known as one hole cable clamps. Such procedure in practice requires that two reverse bends be made in the conduit to bring it into a position to be held by the clamps to the adjacent surface. The reverse bends are done with a tool which is known in the trade as a "hickey" and the procedure is time consuming and laborious.

A primary object of this invention is to simplify the installation and securement of such electrical conduits and associated junction or conduit boxes. A more particular object of the invention is to provide an improved cable clamp which, in a preferred form of the invention is a one hole clamp, but which is made in two parts, including a base and a clamping part attached by a loose grommet through which an attaching screw or nail can be passed. The clamp part is rotatable through 90 degrees with respect to the base. The base provides a support for the conduit of such height that it is spaced from the surface in such a way that it is not necessary to make the reverse bends. In some areas the building or other code requires a galvanized one hole clamp using a base, particularly with respect to certain installations. In such circumstances the difficulty is that it is not possible to hold the base and the clamp and drive a nail, a screw or a power driven Ramset tool by a single person, making it necessary that a helper be provided. The invention described herein permits the clamp to be turned 90 degrees from the base and easily slipped over the conduit with the base then returned through the 90 degrees to a position under the conduit ready for tiedown. This can be done with one hand, thereby eliminating the difficulties previously present. An object of the invention is to realize this result in a simplified way and to overcome the previous difficulties. By keeping the conduit away from the surface in this manner, it is kept cool, free from condensation, dust and strain.

Another object of the invention is to provide a clamp of the type described in the foregoing which may be very simply manufactured by deforming a piece or pieces of metal to provide the base part which may be one-fourth inch in height, for example, and configurated for the conduit to nest in, and the clamp which is over the base to hold the conduit and attached to the base by the loose grommet.

In addition to the preferred form of the invention, modified forms are contemplated which are basically similar. In modified forms of the invention the clamp may be of a two-hole type wherein the clamp and base are secured to the surface at two points rather than one, the modified clamp otherwise having similar characteristics. In another modified form, the base may be in the form of a holding strap which passes around the conduit, the strap being made of a plastic material which is compatible with the conduit, particularly when the conduit itself may be plastic.

Further objects and additional advantages of the invention will become apparent from the following detailed description and annexed drawings wherein:

FIGURE 1 is a perspective view of an installation utilizing the improved clamp of the invention.

FIGURE 2 is an elevational view of a preferred form of the invention;

FIGURE 3 is a plan view of the clamp of FIGURE 2;

FIGURE 4 is a sectional view taken along the line 4—4 of FIGURE 2;

FIGURE 5 is a detail view taken along the line 5—5 of FIGURE 3;

FIGURE 6 is a perspective view showing the use of the clamp;

FIGURE 7 is a perspective view of a modified form of clamp;

FIGURE 8 is a sectional view taken along the line 8—8 of FIGURE 7;

FIGURES 9, 10 and 11 are each perspective views of modified forms of the invention.

Referring now more in detail to FIGURE 1 of the drawings, it shows conventional conduit or junction boxes 10 and 11 having an electrical conduit 13 extending between them. This might be a rigid conduit or electric metallic tubing, that is steel tube known as EMT. The conduit is clamped, as shown, to an adjacent surface which may be a wall or a floor. In such installations, typically the conduit boxes are designed so that the conduit openings may be 1/4", 1/2", 3/4" or 1" from the wall. As explained in the foregoing, ordinarily when such an installation is made by an electrical contractor, the conduit is clamped close to the surface, that is the wall or floor, requiring two reverse bends in the conduit adjacent to the conduit boxes. The reverse bends are made with a tool known in the trade as a "hickey." This operation is tedious and laborious and is eliminated by the invention described herein as shown in FIGURES 1 and 2.

Two clamps are shown in FIGURE 1 at 15 and 16 and one of these clamps is shown more in detail in FIGURES 2, 3, 4 and 5. The surface to which the clamps are secured is designated at 18. The clamp comprises a base part as designated at 20 which may, for example, be fabricated from sheet metal having upstanding parts 22 and 23 which are arcuate as shown at 25 to form a base or seat under the conduit 13 to be clamped. The clamp includes a clamp member 30, preferably stamped from sheet metal, having a configuration as shown in FIGURES 2, 3, and 5. Preferably it has a reinforcing rib 31, the clamp having an arcuate part as shown to clamp over the conduit. The clamp also has a flat extending part 34 which is attached to the base 20 by a loose grommet 36 through which an attaching screw 37 may be passed, as shown in the figures. The base 20 and the clamp member 30 are provided with deformed parts or embossments which provide a detent as shown at 40 which holds the two pieces in aligned position.

FIGURE 6 illustrates the utilization of the clamp. The base 20 can easily be rotated through 90 degrees from the clamp 30 itself. The clamp 30 can be held with one hand and over pipe 13, the securing screw 37 placed through the grommet 36 and loosely secured with the base 20 then rotated back through 90 degrees to its position underneath the conduit 13, as shown in FIGURE 2, providing a base which spaces the conduit upwardly by an amount as indicated at X in FIGURE 2, which may be 1/4" or some other amount. As explained, it becomes unnecessary to provide reverse bends in the conduit 13 and the installation is a one handed operation which can be done by anyone.

FIGURES 7 and 8 show a modified form of the invention. In this form of the invention the base is in the form of a plastic strap as designated at 44 similar to that of the copending application Serial No. 283,633, filed May 27, 1963. This strap wraps the conduit to be clamped. One end part of the strap is narrower as shown at 45 and this part passes through an opening 46 in the other wider part of the strap so that the strap when wrapped, comes into a position shown in FIGURES 7 and 8.

The clamp is of a two hole type there being a metal clamping member 49 having an arcuate part which fits over the wrap of the strap 44 and having extending end tabs 50 and 51 as shown. These end tabs are flush against the ends of the strap 44 and the device is fastened or secured to the surface by way of screws or the like 52 and 53. The screw 52 passes through a grommet 55 by which the wider end of the strap 44 and the clamp 49 are held together as shown in FIGURE 8. This allows a 90-degree movement of the clamp relative to the strap 44, similar to that of the previous embodiment. The clamp 49 can be clamped over the conduit and the securement by the screw 52 then made. The wrap can be made around the conduit, as shown in FIGURES 7 and 8, the narrow end 45 of the plastic strap coming under the tab 51 after which the screw 53 can be set, it preferably extending through an elongated opening 58 in the tab 51.

FIGURE 9 shows a modified form of the invention in which the clamp 48 is like that of the previous embodiment. In this embodiment, however, the base is in the form of a cast member preferably of plastic as designated at 60. This base member has flat end parts 61 and 62 and an arcuate intermediate part 63 which fits inside the clamp 49 and provides a bore receiving the conduit. The cast base part 60 is split or separated, as shown at 65 and it has sufficient resiliency to be separated so that it can be placed over the conduit. This assembly provides two relatively solid pieces, but is utilized and installed in the same manner as in the previous embodiments, the base being rotatable through 90 degrees with respect to the clamp 49.

FIGURE 10 shows a modified form of the invention which is similar to that of the previous embodiment except that it is a device for clamping two closely adjacent conduits and therefore, the clamping member has an additional arcuate clamping part 49' similar to the part 49. Similar parts are identified by the same numerals as in previous embodiments. The base member 60' is cast as in the previous embodiment and has two arcuate portions 63 and 63' which fit inside the clamping configurations 49 and 49' and provide bores to receive and hold the conduits. The base member is split or separated at two points, 65 and 65' so as to be capable of being fitted over the conduits.

In FIGURE 10 the clamping members 49-49' is attached to the base member by screw 52 through a loose grommet 55 as in the previous embodiment so that it can be installed and utilized in a similar manner.

FIGURE 11 shows a form of the invention which is similar to that of FIGURE 9, but which utilizes a single holding screw 53 similarly to the embodiment of FIGURES 2 to 6. It utilizes a casting 70 preferably of plastic, having an extending end part 72 which the tab 51 fits flush against. It has a circular or arcuate part 73 which fits inside the clamp 49 and which is split or separated as shown at 74, so that it can be resiliently fitted around the conduit with which it is used. The base 70 is rotatable through 90 degrees with respect to the clamp 49 by rotation around the screw 53, extending through the slot 58 in the base 70. In this form of the invention the clamp 49 and base 70 attached by the loose grommet 55 as in FIGURES 8 and 9.

From the foregoing those skilled in the art will observe that the invention achieves and realizes all of the objects and advantages as enumerated in the foregoing, as well as having many additional advantages which are apparent from the detailed description. The invention makes possible simplified installations of conduit boxes and connecting conduits eliminating a substantial part of the labor previously required. The device is one that can be very easily manufactured and makes it possible that installations of the type described with a lesser degree of skill more easily and with simpler tools.

The foregoing disclosure is representative of preferred forms of the invention and is to be interpreted in an illustrative rather than a limiting sense, the invention to be accorded the full scope of the claims appended hereto.

I claim:

1. A cable clamp comprising a clamping member configurated to fit over a conduit, a base member configurated to fit under the conduit and to space it from a surface, a grommet rotatably attaching parts of the members together and securing means passed through the grommet to attach the members to a surface, the securing means being of a type to loosely secure the members together initially and to firmly secure the members together when they are secured to the surface by the securing means.

2. A device as in claim 1 including detent means for aligning the position of the clamping member and base member.

3. A device as in claim 2 wherein the clamping member has a central reinforcing and stiffening rib.

References Cited by the Examiner

UNITED STATES PATENTS

| 856,099 | 6/1907 | Peirce | 248—61 |
| 1,861,273 | 5/1932 | Hood | 248—277 X |
| 2,563,769 | 8/1951 | Rose et al. | 248—278 X |
| 2,578,993 | 12/1951 | Downs | 248—65 X |
| 2,681,196 | 6/1954 | Lind | 248—71 |
| 2,761,714 | 9/1956 | Cuskie | 248—74 X |

FOREIGN PATENTS

| 320,872 | 5/1920 | Germany. |
| 668,432 | 12/1938 | Germany. |
| 352,114 | 7/1931 | Great Britain. |
| 716,309 | 9/1954 | Great Britain. |
| 815,606 | 7/1959 | Great Britain. |
| 76,992 | 1/1955 | Netherlands. |

CLAUDE A. LE ROY, *Examiner.*